(12) United States Patent
Caro

(10) Patent No.: US 6,437,697 B1
(45) Date of Patent: Aug. 20, 2002

(54) PROPANE LEVEL MONITOR ASSEMBLY

(76) Inventor: John C. Caro, 1459 Via La Ranchita, San Marcos, CA (US) 92069

( * ) Notice: Subject to any disclaimer, the term of this patent is extended or adjusted under 35 U.S.C. 154(b) by 0 days.

(21) Appl. No.: 09/904,772

(22) Filed: Jul. 13, 2001

(51) Int. Cl.[7] ............................................... G08B 21/00
(52) U.S. Cl. ....................... 340/618; 340/623; 340/547; 340/450.2; 340/688; 116/204; 116/227; 116/288; 116/289; 116/290
(58) Field of Search ................................. 340/618, 623, 340/547, 450.2, 688; 116/204, 227, 288, 289, 290

(56) References Cited

U.S. PATENT DOCUMENTS

| | | | |
|---|---|---|---|
| 4,006,635 A | 2/1977 | Khoi | |
| 4,147,893 A | * 4/1979 | Matson | ........................ 179/2 A |
| 4,369,437 A | * 1/1983 | Thompson, Jr. et al. | .... 340/539 |
| 5,117,449 A | * 5/1992 | Metroka et al. | ............... 379/58 |
| 5,261,276 A | 11/1993 | Gifford | |
| 5,642,097 A | * 6/1997 | Martel | ......................... 340/618 |
| D385,209 S | 10/1997 | Mercer et al. | |
| 5,708,424 A | 1/1998 | Orlando et al. | |
| 5,762,118 A | 6/1998 | Epworth et al. | |
| 5,899,962 A | 5/1999 | Louwagie et al. | |
| 6,166,630 A | * 12/2000 | King | ........................ 340/450.2 |

* cited by examiner

*Primary Examiner*—Jeffery Hofsass
*Assistant Examiner*—Tai T. Nguyen

(57) ABSTRACT

A propane level monitor assembly for determining the level of propane in a storage tank. The propane level monitor assembly includes a gauge monitor assembly including a housing being adapted to be removably mounted upon a propane tank gauge, and also including a transmitter being disposed in the housing; and further includes a receiver unit including a housing member and also a receiver member being disposed in the housing member for receiving waves transmitted by the transmitter.

6 Claims, 1 Drawing Sheet

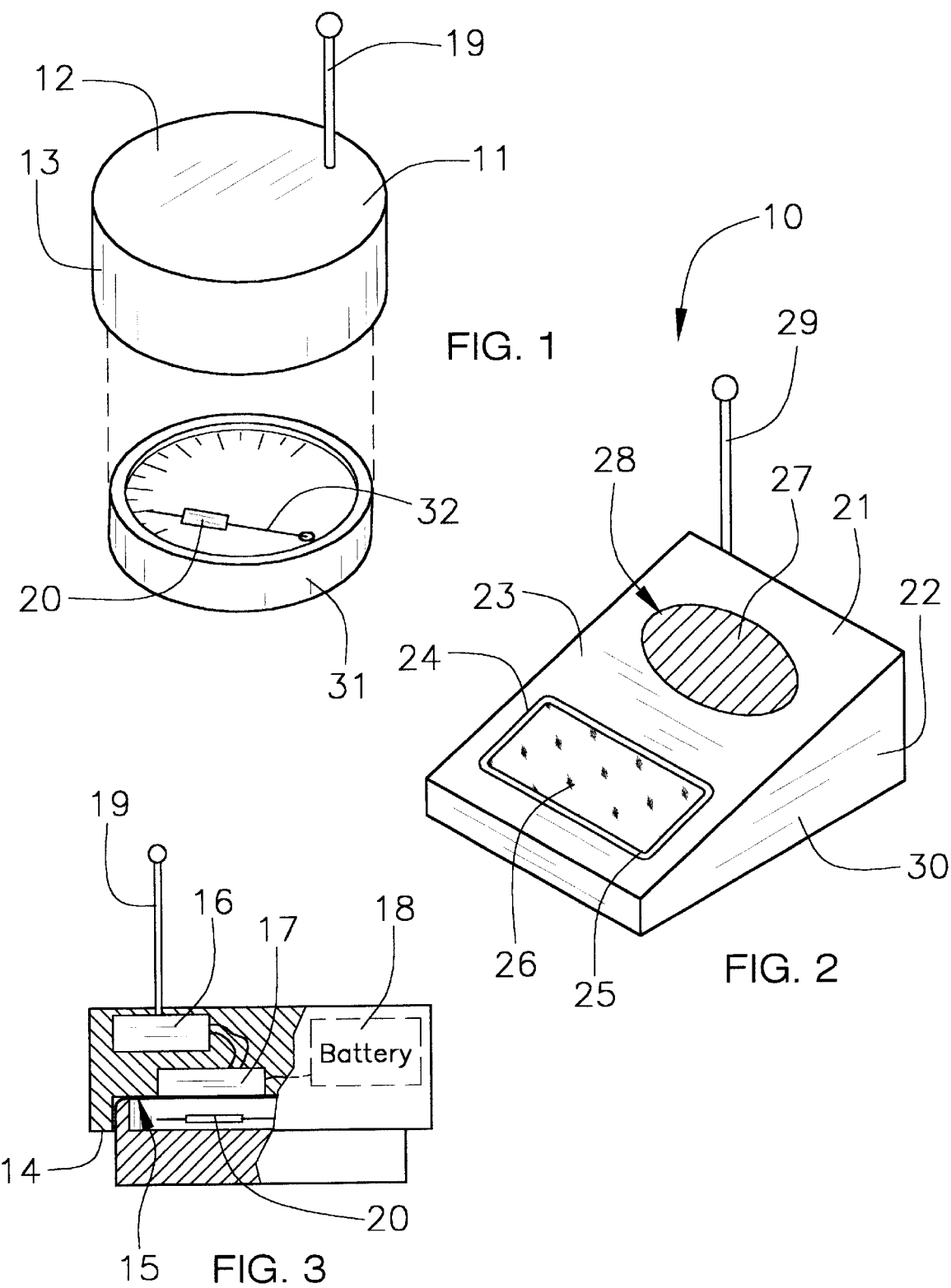

PROPANE LEVEL MONITOR ASSEMBLY

BACKGROUND OF THE INVENTION

1. Field of the Invention

The present invention relates to propane level monitors and more particularly pertains to a new propane level monitor assembly for determining the level of propane in a storage tank.

2. Description of the Prior Art

The use of propane level monitors is known in the prior art. More specifically, propane level monitors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,708,424; 5,261,276; 5,899,962; 4,006.635; 5,762,118; and U.S. Pat. No. Des. 385,209.

While these devices fulfill their respective, particular objectives and requirements, the aforementioned patents do not disclose a new propane level monitor assembly. The inventive device includes a gauge monitor assembly including a housing being adapted to be removably mounted upon a propane tank gauge, and also including a transmitter being disposed in the housing; and further includes a receiver unit including a housing member and also a receiver member being disposed in the housing member for receiving waves transmitted by the transmitter.

In these respects, the propane level monitor assembly according to the present invention substantially departs from the conventional concepts and designs of the prior art, and in so doing provides an apparatus primarily developed for the purpose of determining the level of propane in a storage tank.

SUMMARY OF THE INVENTION

In view of the foregoing disadvantages inherent in the known types of propane level monitors now present in the prior art, the present invention provides a new propane level monitor assembly construction wherein the same can be utilized for determining the level of propane in a storage tank.

The general purpose of the present invention, which will be described subsequently in greater detail, is to provide a new propane level monitor assembly which has many of the advantages of the propane level monitors mentioned heretofore and many novel features that result in a new propane level monitor assembly which is not anticipated, rendered obvious, suggested, or even implied by any of the prior art propane level monitors, either alone or in any combination thereof.

To attain this, the present invention generally comprises a gauge monitor assembly including a housing being adapted to be removably mounted upon a propane tank gauge, and also including a transmitter being disposed in the housing; and further includes a receiver unit including a housing member and also a receiver member being disposed in the housing member for receiving waves transmitted by the transmitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new propane level monitor assembly which has many of the advantages of the propane level monitors mentioned heretofore and many novel features that result in a new propane level monitor assembly which is not anticipated, rendered obvious, suggested, or even implied by any of the prior art propane level monitors, either alone or in any combination thereof.

It is another object of the present invention to provide a new propane level monitor assembly which may be easily and efficiently manufactured and marketed.

It is a further object of the present invention to provide a new propane level monitor assembly which is of a durable and reliable construction.

An even further object of the present invention is to provide a new propane level monitor assembly which is susceptible of a low cost of manufacture with regard to both materials and labor, and which accordingly is then susceptible of low prices of sale to the consuming public, thereby making such propane level monitor assembly economically available to the buying public.

Still yet another object of the present invention is to provide a new propane level monitor assembly which provides in the apparatuses and methods of the prior art some of the advantages thereof, while simultaneously overcoming some of the disadvantages normally associated therewith.

Still another object of the present invention is to provide a new propane level monitor assembly for determining the level of propane in a storage tank.

Yet another object of the present invention is to provide a new propane level monitor assembly which includes a gauge monitor assembly including a housing being adapted to be removably mounted upon a propane tank gauge, and also including a transmitter being disposed in the housing; and further includes a receiver unit including a housing member and also a receiver member being disposed in the housing member for receiving waves transmitted by the transmitter.

Still yet another object of the present invention is to provide a new propane level monitor assembly that is easy and convenient to install and use.

Even still another object of the present invention is to provide a new propane level monitor assembly that eliminates the user from having to go to the storage tank to visually check the propane tank gauge.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the gauge monitor assembly of a new propane level monitor assembly according to the present invention.

FIG. 2 is a perspective view of the receiver unit of the present invention.

FIG. 3 is a cross-sectional view of the gauge monitor assembly of the present invention.

DESCRIPTION OF THE PREFERRED EMBODIMENT

With reference now to the drawings, and in particular to FIGS. 1 through 3 thereof, a new propane level monitor assembly embodying the principles and concepts of the present invention and generally designated by the reference numeral 10 will be described.

As best illustrated in FIGS. 1 through 3, the propane level monitor assembly 10 generally comprises a gauge monitor assembly including a housing 11 being adapted to be removably mounted upon a propane tank gauge 31, and also including a transmitter 16 being conventionally disposed in the housing 11. The housing 11 is disc-shaped which includes a top wall 12, a side wall 13, a bottom wall 14, and a recessed portion 15 being disposed in the bottom wall 14 and being adapted to receive a top portion of the propane tank gauge 31. The gauge monitor assembly also includes an antenna 19 being conventionally disposed through the top wall 12:of the housing 11 and being conventionally connected to the transmitter 16, and further includes a sensor 17 being conventionally disposed in the housing 11 and being conventionally connected to the transmitter 16, and also includes at least one battery 18 being removably disposed in the housing 11 and being conventionally connected to the sensor 17 for the energizing thereof, and further includes a magnet member 20 being adapted to be conventionally attached to a level indicator needle 32 of the propane tank gauge 32 with the sensor 17 being an inductive sensor which senses movement of the magnet member 20 to determine level of propane in a storage tank.

A receiver unit 21 includes a housing member 22 and also a receiver member 24 being conventionally disposed in the housing member 22 for receiving waves transmitted by the transmitter 16. The receiver unit 21 further includes a microprocessor 25 being conventionally disposed in the housing member 22 and being conventionally connected to the receiver member 24, and also includes at least one battery 30 being conventionally disposed in the housing member 22 and being conventionally connected to the microprocessor 25, and further includes a display screen 26 being conventionally disposed in a top wall 23 of the housing member 22 and being conventionally connected to the microprocessor 25 for displaying data thereupon, and also includes a speaker 27 being disposed in the housing member 22 and being conventionally connected to the microprocessor 25 and being disposed at a speaker port 28 in the top wall 23 of the housing member 22, and further includes an antenna member 29 being conventionally extended in the housing member 22 and being conventionally connected to the receiver member 24 for receiving wave transmissions from the gauge monitor assembly.

In use, the user attaches the gauge monitor assembly to the propane tank gauge 31, and turns on the receiver unit 21 to receive propane level readings from the gauge monitor assembly with the propane level readings being displayed upon the display screen 26.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A propane level monitor assembly comprising:
 a gauge monitor assembly including a housing being adapted to be removably mounted upon a propane tank gauge, and also including a transmitter being disposed in said housing;
 a receiver unit including a housing member and also a receiver member being disposed in said housing member for receiving waves transmitted by said transmitter;
 wherein said housing is disc-shaped which includes a top wall, a side wall, a bottom wall, and a recessed portion being disposed in said bottom wall and being adapted to receive a top portion of the propane tank gauge; and
 wherein said gauge monitor assembly also includes an antenna being disposed through said top wall of said housing and being connected to said transmitter, and further includes a sensor being disposed in said housing and being connected to said transmitter, and also includes at least one battery being removably disposed in said housing and being connected to said sensor for the energizing thereof, and further includes a magnet member being adapted to be attached to a level indicator needle of the propane tank gauge.

2. A propane level monitor assembly as described in claim 1, wherein said sensor is an inductive sensor which senses movement of said magnet member to determine level of propane in a storage tank.

3. A propane level monitor assembly as described in claim 1, wherein said receiver unit further includes a microprocessor being disposed in said housing member and being connected to said receiver member, and also includes at least one battery being disposed in said housing member and being connected to said microprocessor, and further includes a display screen being disposed in a top wall of said housing member and being connected to said microprocessor for displaying data thereupon, and also includes a speaker being disposed in said housing member and being connected to said microprocessor and being disposed at a speaker port in said top wall of said housing member, and further includes an antenna member being extended in said housing member and being connected to said receiver member for receiving wave transmissions from said gauge monitor assembly.

4. A propane level monitor assembly comprising:

a gauge monitor assembly including a housing being adapted to be removably mounted upon a propane tank gauge, and also including a transmitter being disposed in said housing, said housing being disc-shaped which includes a top wall, a side wall, a bottom wall, and a recessed portion being disposed in said bottom wall and being adapted to receive a top portion of the propane tank gauge, said gauge monitor assembly also including an antenna being disposed through said top wall of said housing and being connected to said transmitter, and further including a sensor being disposed in said housing and being connected to said transmitter, and also including at least one battery being removably disposed in said housing and being connected to said sensor for the energizing thereof, and further including a magnet member being adapted to be attached to a level indicator needle of the propane tank gauge, said sensor being an inductive sensor which senses movement of said magnet member to determine level of propane in a storage tank; and a receiver unit including a housing member and also a receiver member being disposed in said housing member for receiving waves transmitted by said transmitter, said receiver unit further including a microprocessor being disposed in said housing member and being connected to said receiver member, and also including at least one battery being disposed in said housing member and being connected to said microprocessor, and further including a display screen being disposed in a top wall of said housing member and being connected to said microprocessor for displaying data thereupon, and also including a speaker being disposed in said housing member and being connected to said microprocessor and being disposed at a speaker port in said top wall of said housing member, and further including an antenna member being extended in said housing member and being connected to said receiver member for receiving wave transmissions from said gauge monitor assembly.

5. A propane level monitor assembly comprising:

a gauge monitor assembly including a housing being adapted to be removably mounted upon a propane tank gauge, and also including a transmitter being disposed in said housing; a receiver unit including a housing member and also a receiver member being disposed in said housing member for receiving waves transmitted by said transmitter;

wherein said housing includes a top wall, a side wall, a bottom wall, and a recess in said bottom wall being adapted to receive a top portion of the propane tank gauge;

wherein said gauge monitor assembly also includes an antenna being mounted on said housing and being connected to said transmitter, a sensor being disposed in said housing and being connected to said transmitter, and a magnet member being adapted to be attached to a level indicator needle of the propane tank gauge.

6. A propane level monitor assembly as described in claim 5, further comprising a battery being removably disposed in said housing and being connected to said sensor for the energizing thereof.

* * * * *